_(12)_ United States Patent
Kasper

(10) Patent No.: US 6,941,391 B2
(45) Date of Patent: *Sep. 6, 2005

(54) FENCEPOST DESCRIPTOR CACHING MECHANISM AND METHOD THEREFOR

(75) Inventor: Christian D. Kasper, Andover, MA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/758,379

(22) Filed: Jan. 15, 2004

(65) Prior Publication Data

US 2004/0153588 A1 Aug. 5, 2004

Related U.S. Application Data

(63) Continuation of application No. 09/510,387, filed on Feb. 22, 2000, now Pat. No. 6,691,178.

(51) Int. Cl.$^7$ ............................................. G06F 13/28
(52) U.S. Cl. ........................ 710/22; 710/24; 709/213; 711/129; 711/147
(58) Field of Search ...................... 710/22–26, 30, 710/52–57, 106; 709/213; 711/129, 137

(56) References Cited

U.S. PATENT DOCUMENTS

| | | | |
|---|---|---|---|
| 4,933,846 A | 6/1990 | Humphrey et al. | ......... 364/200 |
| 4,953,157 A | 8/1990 | Franklin et al. | ............... 370/60 |
| 5,136,582 A | 8/1992 | Firoozmand | ................ 370/85.1 |
| 5,299,313 A | 3/1994 | Petersen et al. | ............. 395/200 |
| 5,533,203 A | 7/1996 | Fischer et al. | ............... 395/250 |
| 5,745,790 A | 4/1998 | Oskouy | ........................ 395/853 |
| 5,781,799 A | 7/1998 | Leger et al. | ................ 395/842 |
| 6,041,328 A | 3/2000 | Yu | ............................. 707/10 |
| 6,049,850 A | 4/2000 | Vishlitzky et al. | .......... 711/136 |
| 6,145,016 A | 11/2000 | Lai et al. | ........................ 710/4 |
| 6,182,164 B1 | 1/2001 | Williams | ...................... 710/15 |
| 6,185,633 B1 | 2/2001 | Johnson | ...................... 710/22 |
| 6,363,444 B1 | 3/2002 | Platko et al. | ................ 710/110 |

Primary Examiner—Jeffrey Gaffin
Assistant Examiner—Eron Sorrell
(74) Attorney, Agent, or Firm—Lisa K. Jorgenson; Christopher F. Regan

(57) ABSTRACT

A system and method for reducing transfer latencies in fencepost buffering requires that a cache is provided between a host and a network controller having shared memory. The cache is divided into a dual cache having a top cache and a bottom cache. A first and second descriptor address location are fetched from shared memory. The two descriptors are discriminated from one another in that the first descriptor address location is a location of an active descriptor and the second descriptor address location is a location of a reserve/lookahead descriptor. The active descriptor is copied to the top cache. A command is issued to DMA for transfer of the active descriptor. The second descriptor address location is then copied into the first descriptor address. The next descriptor address location from external memory is then fetched and placed in the second descriptor address location.

30 Claims, 14 Drawing Sheets

[0x31] CMDREG - DMA COMMAND REGISTER

| DMA BIT NAME | 31 30 RESERVED | 29 SFAN | 28 STINT | 27 SRINT | 26 25 PORT[1:0] | 24 RW | 23 TXERXS | 22 RESDMD | 21 TYPE | 20 NOCRC | 19 RXSEL | 18 REOC | 17 16 TXEOPA[1:0] | 15 14 13 12 11 10 9 8 CPC_ADDR[7:0] | 7 6 5 4 3 2 1 0 XFER_CNT[7:0] |
|---|---|---|---|---|---|---|---|---|---|---|---|---|---|---|---|
| RESET VALUE | 0 0 | 0 | 0 | 0 | 0 0 | 0 | 0 | 0 | 0 | 0 | 0 | 0 | 0 0 | 0 0 0 0 0 0 0 0 | 0 0 0 0 0 0 0 0 |
| HOST ACCESS | (READ-ZEROS) / (NO-WRITE) ||||||||||||||||
| HOST UNLOCK | READ-ONLY | READ-ZEROS/WRITE |||||||||||||||
| CPC ACCESS | READ-ONLY | READ-ZEROS/WRITE |||||||||||||||

| BIT # | FIELD | NAME | DESCRIPTION |
|---|---|---|---|
| 31:30 | RESERVED | -- | THESE BITS ARE NOT IMPLEMENTED |
| 29 | SFAN | SET FAN | (1=SET; 0=NORMAL) WHEN SET DIRECTS DMA HARDWARE TO GENERATE FAN (BIT 27, 19, 11, 3 OF THE REGISTER MIR) UPON COMPLETION OF THE ASSOCIATED COMMAND TRANSFERING BUFFER OWNERSHIP TO THE HOST. THE DMA SET ONE OF THE FOUR POSSIBLE FAN ACCORDING WITH THE PORT NUMBER SPECIFIED ON THE BITS 26, 25, OF THIS REGISTER. |
| 28 | STINT | SET TINT | (1=SET; 0=NORMAL) WHEN SET DIRECTS DMA HARDWARE TO GENERATE TINT (BIT 25, 17, 9, 1 OF THE REGISTER MIR) UPON COMPLETION OF THE ASSOCIATED COMMAND TRANSFERING BUFFER OWNERSHIP TO THE HOST. THE DMA SET ONE OF THE FOUR POSSIBLE TINT ACCORDING WITH THE PORT NUMBER SPECIFIED ON THE BITS 26, 25, OF THIS REGISTER. |
| 27 | SRINT | SET RINT | (1=SET; 0=NORMAL) WHEN SET DIRECTS DMA HARDWARE TO GENERATE RINT (BIT 24, 16, 8, 0 OF THE REGISTER MIR) UPON COMPLETION OF THE ASSOCIATED COMMAND TRANSFERING BUFFER OWNERSHIP TO THE HOST. THE DMA SET ONE OF THE FOUR POSSIBLE TINT ACCORDING WITH THE PORT NUMBER SPECIFIED ON THE BITS 26, 25, OF THIS REGISTER. |
| 26:25 | PORT | PORT NUMBER | (11=PORT 3; 10=PORT 2; 01=PORT 1; 00=PORT 0) *ONLY FOR FIFO/SYSMEM TRANSFERS.* INDICATES THE HDLC PORT NUMBER TO BE USED BY THE DMA FOR FIFO/SYSMEM TRANSFER. |
| 24 | RW | SYSTEM MEMORY READ/WRITE | (1=READ; 0=WRITE) *USED FOR ALL TRANSFER TYPES.* INDICATES THE DIRECTION OF DATA FLOW WITH RESPECT TO SYSTEM MEMORY. WHEN USED FOR FIFO/SYSMEM TRANSFERS THIS FIELD CAN ALSO BE THOUGHT OF AS SELECTING THE Tx- OR Rx- FIFO WITHIN THE HDLC PORT INDICATED IN THE PORT FIELD (Tx=1; Rx=0). |
| 23 | TXERXS | Tx END-OF FRAME/ Rx START-OF-FRAME | (1=Tx EOP OR Rx SOP; 0=NORMAL) *ONLY USED FOR FIFO/SYSMEM TRANSFERS.* SYSMEM-TO-FIFO TRANSFERS (RW=1): INDICATES THIS COMMAND CONSTITUTES THE FINAL TRANSFER OF DATA FOR A GIVEN TRANSMIT FRAME. FIFO-TO-SYSMEM TRANSFERS (RW=0): INDICATES THIS COMMAND IS THE FIRST DATA TRANSFER FOR A GIVEN RECEIVE FRAME. |
| 22 | RESDMD | RESPONSE DEMAND | (1=GENERATE RESPONSE; 0=NO RESPONSE) *USED FOR ALL TRANSFER TYPES.* ALLOWS THE FIRMWARE TO CONTROL WHETHER OR NOT AN INTERRUPT WILL BE GENERATED FOR THIS COMMAND BY THE DMA. WHEN THIS BIT IS SET THE DMA WILL GENERATES ONE OF THE 8 POSSIBLE INTERRUPTS. EACH INTERRUPT IS RELATIVE TO ONE OF THE 4 PORTS, ACCORDING TO THE PORT NUMBER SPECIFIED ON THE BITS 26,25, AND THE DIRECTION OF THE DATA FLOW SPECIFIED ON THE BIT 24 OF THIS REGISTER. |
| 21 | TYPE | TRANSFER TYPE | (1=TPR/SYSMEM TRANSFER; 0=FIFO/SYSMEM TRANSFER) *USED FOR ALL TRANSFER TYPES.* DETERMINES WHETHER THE DMA WILL PERFORM A TPR/SYSMEM TRANSFER OR A FIFO/SYSMEM TRANSFER. |

*FIG. 12A*

| BIT # | FIELD | NAME | DESCRIPTION |
|---|---|---|---|
| 20 | NOCRC | NO Tx CRC | (1=CRC NOT APPENDED; 0=CRC APPENDED) *ONLY FOR SYSMEM-TO-FIFO TRANSFERS WHEN RW=1 AND TXERXS=1.* ALLOWS THE FIRMWARE TO CONTROL WHETHER OR NOT THE HDLC TRANSMITTER WILL APPEND A CRC TO THE END OF A GIVEN TRANSMIT FRAME. |
| 19 | RXSEL | Rx SELECTION | (1=RX; 0=TX) THIS BIT DISTINGUISH BETWEEN GENERATIN THE RX OR THE TX RESPONSE DEMAND INTERRUPT. |
| 18 | REOC | REQUEST END OF COMMAND | (1=SET; 0=NORMAL) WHEN SET DIRECTS DMA HARDWARE TO SET THE BIT 3 OF THE DMASTAT AFTER COMPLETION OF THE CURRENT COMMAND. |
| 17:16 | TXEOPA | TRANSMIT END-OF-FRAME ALIGNMENT | (11=3 BYTE; 10=2 BYTES; 01=1 BYTE; 00=4 BYTES) *ONLY FOR SYSMEM-TO-FIFO TRANSFERS WHEN RW=1 AND TXERXS=1.* COMMUNICATES TO THE DMA THE NUMBER OF VALID BYTES IN THE LAST WORD OF A TRANSMIT FRAME TRANSFER. |
| 15:8 | CPC_ADDR | CPC ADDRESS | (8-BIT BINARY VALUE) *ONLY FOR TPR/SYSMEM TRANSFERS.* INDICATES THE STARTING WORD ADDRESS WITHIN THE CPC'S MEMORY. THE DMA HAS NO PROVISION TO PROTECT FROM WRAP-AROUND (0xFF TO 0x00). |
| 7:0 | XFER_CNT | TRANSFER COUNT | (8-BIT BINARY VALUE) *USED FOR ALL TRANSFER TYPES.* INDICATES THE FIRMWARE-REQUESTED NUMBER OF DATA-TRANSFERRING UCLK CYCLES THE DMA WILL PERFORM — KNOWN AS THE "BURST SIZE". THIS IS THE NUMBER 4-BYTE WORDS THE DMA WILL TRANSFER DURING ITS EXECUTION OF THE COMMAND. EXCEPTIONS OCCURE WHEN THE DMA ENCOUNTERS Rx END-OF-FRAME BEFORE THE TRANSFER COUNT HAS BEEN SATISFIED AND/OR WHEN ONE OR MORE OF THE BYTES WITHIN A WORD BEING TRANSFERRED ARE NOT VALID (INDICATED BY THE DBYTE(3:0) PINS). A VALUE OF 0x00 INDICATES A BURST SIZE OF 256. |

FENCEPOST DESCRIPTOR CACHING MECHANISM AND METHOD THEREFOR

RELATED APPLICATIONS

This application is a continuation of Ser. No. 09/510,387 filed Feb. 22, 2000, the disclosure of which is hereby incorporated by reference in its entirety now U.S. Pat. No. 6,691,178.

This application is also related to co-pending U.S. Patent Applications entitled "METHOD AND SYSTEM OF CONTROLLING TRANSFER OF DATA BY UPDATING DESCRIPTORS IN DESCRIPTOR RINGS"; "METHOD AND SYSTEM OF ROUTING NETWORK BASED DATA USING FRAME ADDRESS NOTIFICATION"; and "METHOD AND APPARATUS FOR CONTROLLING NETWORK DATA CONGESTION" all filed Sep. 30, 1998, in the name of the same inventor as this application and assigned to the same assignee. Accordingly, the contents of all the related applications are incorporated by reference into this application.

FIELD OF THE INVENTION

This invention relates generally to a method and system for controlling the transfer of network based data arranged in frames between a host and controller having shared memory and, more particularly, to a fencepost caching mechanism for receiving and transmitting descriptor ring updates.

BACKGROUND OF THE PRIOR ART

Data networks have become increasingly important in day-to-day activities and business applications. Most of these networks are a packet-switched network, such as the Internet, which uses a transmission control protocol, frequently referred to as TCP/IP. The Transmission Control Protocol (TCP) manages the reliable reception and transmission of network traffic, while the Internet Protocol (IP) is responsible for routing and ensuring that the packets are sent to a correct destination.

In a typical network, a mesh of transmission links are provided, as well as switching nodes and end nodes. End nodes typically ensure that any packet is received and transmitted on the correct outgoing link to reach its destination. The switching nodes are typically referred to as packet switches, or routers, or intermediate systems. The sources and destinations in data traffic (the end nodes) can be referred to as hosts and end systems. These host and end systems typically consist of personal computers, workstations, and other terminals.

The network infrastructure employs routers that can determine optimum paths by using routing algorithms. The routers also switch packets arriving at an input port to an output port based on the routing path for each packet. The routing algorithms (or routing protocol) are used to initialize and maintain routing tables that consist of entries that point to a next router to send a packet with a given destination address. Typically, fixed costs are assigned to each link in the network and the cost reflects link bandwidth and/or cost. The least cost paths can be determined by a router after it exchanges network topology and link cost information with other routers. A traditional router is basically a computer dedicated to the task of moving packets of data from one channel to the next. Like most computers, it consists of a central MPU, bus, and memory but distinguished by its possession of multiple I/O channels usually managed by dedicated communication controllers.

A communication controller relieves a central MPU of many of the tasks associated with transmitting and receiving frames. A frame (sometimes referred to as a packet) is a single communication element which can be used for both link-control and data transfer purposes.

Most controllers include a direct memory access (DMA) device or function which provides access to an external shared memory resource. The controller allows either DMA or non-DMA data transfers. The controller accepts a command from the MPU, executes the command, and provides an interrupt and result back to the MPU.

These command operations often entail movement or control of various data structures. Data structures are used for the temporary storage of frames. They play a key role in the architecture of any successful router. Implementations vary, but generally one finds two species: ring buffers and linked lists.

A ring buffer consists of two components: descriptors and frame data buffers. Descriptors both describe and point to a respective frame data buffer within a shared system memory between the host and a controller. The descriptor ring is a circular queue composed of multiple descriptor entries containing pointers and information describing data buffers. Each descriptor ring is dedicated to a specific memory and mapped to specific channels within the controller. Each two-word descriptor entry within a descriptor ring is associated with one specific buffer in a system memory, such as the shared system memory between a network device, such as a controller and host.

The frame buffers are typically defined as blocks of memory containing frames for transmission or providing space for frame reception. Each transmit channel and each receive channel would use a dedicated descriptor ring. Whenever a frame exceeds the finite capacity of a single frame data buffer, the frame is said to "span" the buffer. An ownership bit in the first word of each descriptor indicates whether the host or controller owns the associated frame data buffer.

Ownership follows a specific protocol that must be adhered to by the controller and the host. Once ownership of a descriptor has been relinquished to the other device or host, no part of the descriptor or its associated buffer may be altered. The host gives the network device ownership of empty frame data buffers for frame transmission. Conversely, the network device passes ownership back to the host for transmit frame data buffers it has used and receive frame data buffers it has filled.

For frame reception, the host is required to provide the controller or other network device with ownership of contiguous descriptors pointing to empty frame data buffers. Once a frame is fully received by the controller, ownership of its constituent descriptors is then reassigned. The host is signaled regarding the event via an interrupt. The host is typically obligated to read a Master Interrupt Register (MIR) in order to surmise the meaning of the signal. Once this is accomplished, the frame may then be dispatched in some fashion and ownership of the relevant descriptors return to the controller.

In typical operation, the host "follows" the controller or other network device around the ring leaving "empty" descriptors in its wake for the controller to use. If the device gets too far ahead of the host, it can wrap around the descriptor ring and encounter descriptors it does not own. As a result, incoming frames could be lost if this were to occur.

For frame transmission, the device "follows" the host round a transmit descriptor ring leaving used descriptors in its wake for the host to reclaim. The host transfers ownership of descriptors to the device when it has one or more frames ready for transmission. Once a frame is fully transmitted by the device, ownership of its constituent descriptors is transferred back to the host for reuse. The host is signaled regarding this event via an interrupt.

In certain applications, the host may elect to use data buffers which are smaller in size than the frames that are actually received or transmitted. A single frame may therefore be forced to span multiple buffers. This type of system would allow frames to be dissected (scattered on reception) or assembled (gathered on transmission) by the controller. Multiple buffers can hold the constituent pieces of a frame by "chaining" or grouping the associated descriptors together. The chained descriptors are consecutive entries in a descriptor ring with the end-of-frame flag set in the terminating descriptor of the chain. In other words, data buffer of a descriptor entry which is owned but whose end-of-frame flag (EOF) is not set is considered to be part of a frame and not an entire frame. Scatter/gather buffering benefits frames crossing multiple layers of communication protocol. Rather than laboriously copying large buffers from one service layer to the next, small pointers are passed instead. These pointers are ultimately converted into or generated from frame descriptors.

During reception of large frames, the device "chains" or groups the descriptors together one by one as it fills each successive frame data buffer. When the end of the frame is received and transferred to the shared system memory, the end-of-frame flag is set in the terminating descriptor of the chain. During transmission, the controller is able to construct sequentially a single frame from contents of chained buffers. Transmission of the frame terminates only when it encounters a buffer whose descriptor has set the end-of-frame flag.

Fencepost buffering gets its name from the idea that rather than successively updating each spanned descriptor, only the terminal descriptors need to be altered. Thus, at most one, in the case that a packet spans a single descriptor, or at most two descriptors ever need to be updated. This relaxes the dependency between packet size and buffer management overhead. While the reduction of descriptor activity in turn reduces total bus traffic and further reduces packet latency, latency issues persist.

Therefore, a need existed to provide a system and method which reduces frame transfer latency in fencepost procedures. The system and method must permit descriptor transfer to and from memory in a reliable and efficient manner. The system and method must further reduce complications arising from instrumenting a ringbuffer. The system and method must further avoid resource race conditions between DMA and the CPU.

SUMMARY OF THE INVENTION

Accordingly, it is an object of this invention to provide a caching mechanism and method to support fencepost procedures.

It is a further object of this invention to provide a system and method which reduces frame transfer latency in fencepost procedures.

It is another object of this invention to provide a system and method which permit descriptor transfer to and from memory in a reliable and efficient manner.

It is still another object of this invention to provide a system and method which reduce complications arising from instrumenting a ringbuffer.

It is another object of this invention to provide a system and method which avoid resource race conditions between DMA and the CPU.

BRIEF DESCRIPTION OF THE PREFERRED EMBODIMENTS

In accordance with one embodiment of this invention, a method for reducing transfer latencies in fencepost buffering is disclosed. In the method a cache is provided between a network controller and a host entity with shared memory. The cache is divided into a dual cache having a top cache and a bottom cache. A first and second descriptor address location are fetched from shared memory. The two descriptors are discriminated from one another in that the first descriptor address location is a location of an active descriptor and the second descriptor address location is a location of a reserve descriptor. The active descriptor is copied to the top cache. A command is issued to DMA for transfer of the active descriptor. The second descriptor address location is then copied into the first descriptor address. The next descriptor address location from external memory is then fetched and placed in the second descriptor address location.

In accordance with another embodiment of this invention, a method for reducing transfer latencies in fencepost buffering having chained descriptors is disclosed. The method provides a cache between a network controller and a network controller having shared memory wherein the cache has a top cache and a bottom cache. A first and second descriptor address location is fetched from shared memory. The first descriptor address location is a location of an active descriptor and the second descriptor address location is a location of a look-ahead descriptor. The ownership of the terminal descriptors describing a frame need to be updated. This requires writing a modified End of Frame (EOF) descriptor to cache before writing the Start of Package (SOP) descriptor. Commands are then issued to DMA for transfer of both cached descriptors to external shared memory. The second descriptor address location is then copied into the first descriptor address. The next descriptor address location from external memory is then fetched and placed in the second descriptor address location.

The foregoing and other objects, features and advantages of this invention will be apparent from the following more particular description of the preferred embodiments of the invention as illustrated in the accompanying drawings.

BRIEF DESCRIPTION OF THE FIGURES

FIG. 12A shows the DMA Command register and a description of the associated bits of the DMA Command register.

FIG. 12B provides a description of additional bits of the DMA Command register.

DESCRIPTION OF THE SPECIFICATION

Figure 1:
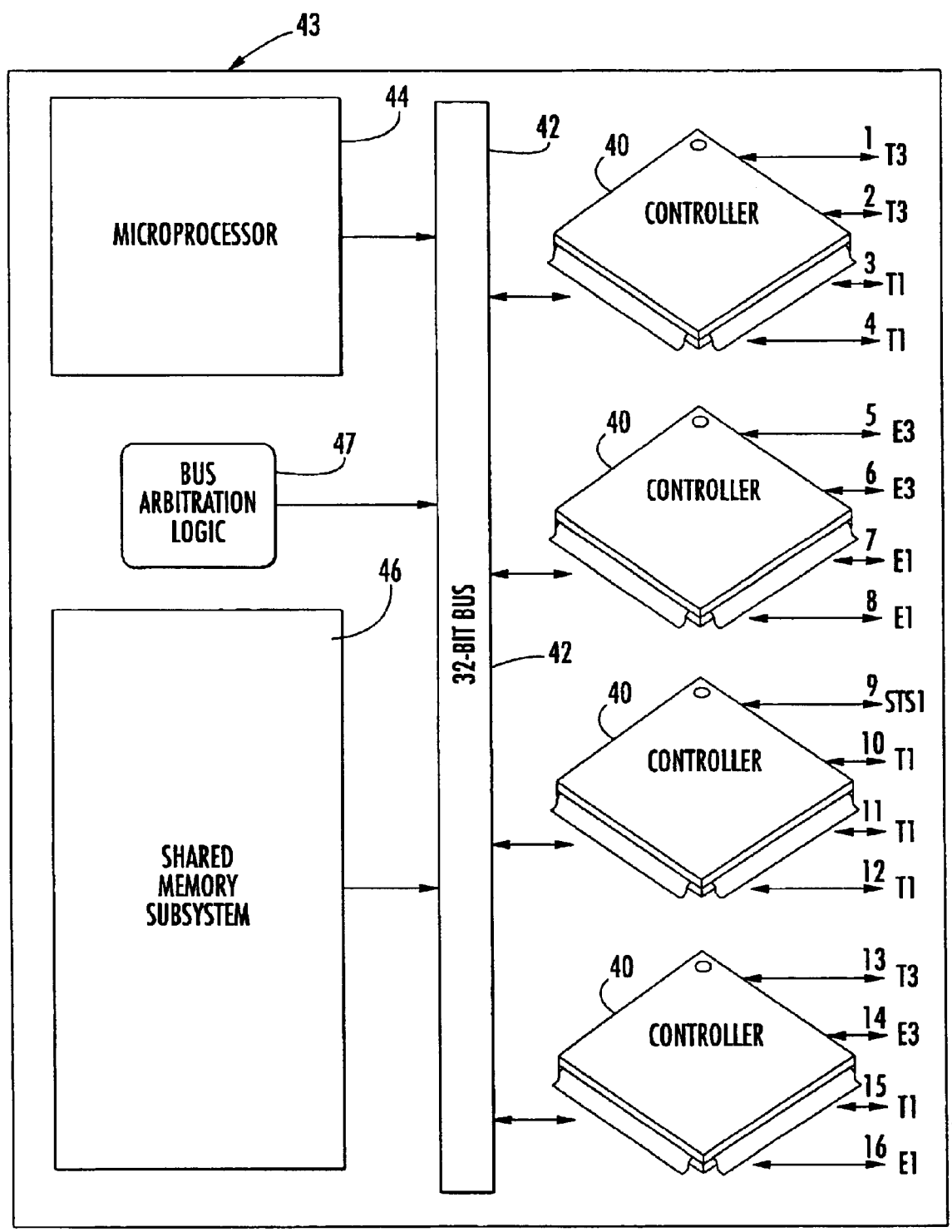
FIG. 1 is a high level block diagram of a plurality of network devices which are connected to a system bus and showing the host system microprocessor, bus arbitration logic and shared memory subsystem.

Referring to FIGS. 1–5, a high level system diagram, which is illustrative of a system which would use the present invention is shown. As illustrated, a plurality of network controllers 40, also known as network devices, are coupled to a system bus 42, which is coupled to a host system 43. A host microprocessor 44 is coupled to the system bus 42, as is a shared memory subsystem 46. Each controller 40 has four ports 50, 52, 54, 56, that connect to respective high-level data link control layers, full duplex protocol lines 58.

Each network controller 40 is a high performance, four port, high speed network controller designed for use in next generation bridge and router equipment, as well as any equipment requiring HDLC operation at T1 or T3 speeds. Each network controller 40 is preferably manufactured as a single chip.

Figure 2:
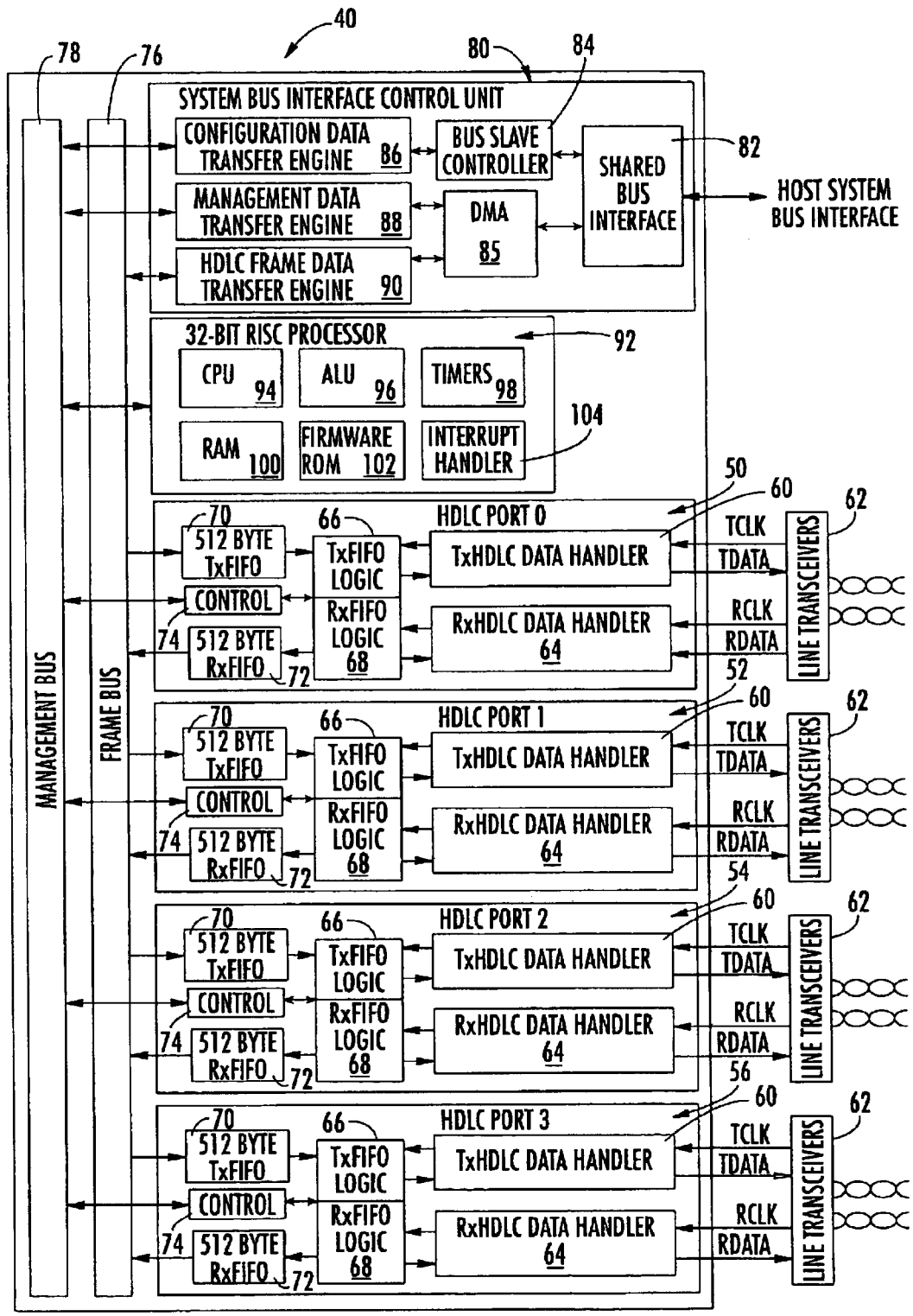
FIG. 2 is a high level block diagram of a network controller showing a plurality of ports, a communications processor, and a system bus interface control unit.

As shown in FIG. 2, on the network side, the network controller 40 contains four ports 50, 52, 54, and 56, each with separate transmit and receive FIFOs allowing half or full duplex operation. Each port 50–56 has transmit data handler 60 that receives transmit clock signals (TCLK) and forwards data signals (T Data) to line transceivers 62. The receive data handler 64 also receives clock signals (RCLK) and sends data to and from the line transceiver 62. The ports also each include the illustrated transmit and receive First-In/First-Out (FIFO) logic circuits 66,68; the 512 byte transmit FIFO 70, control circuit 74, and the 512 byte receive FIFO 72. The 512 byte FIFOs 70,72 connect to the frame bus 76 and the control circuit 74 connects to the management bus 78. The FIFO logic circuits 66,68, and data handler 60,64 and the control circuit 74 work as appropriate transmit and receive circuitry for the transmit (Tx) and receive (Rx) 512-byte FIFOs.

On the system side, the controller 40 has a high speed, 32-bit system bus interface control unit (SBI) 80 which uses single cycle word transfers to minimize the controller's system bus usage and maximize its performance. The direct memory access unit (DMA) operation enables the device to become a bus master, and can use an efficient buffer management algorithm for store-and-forward or cut-through applications. The system bus interface control unit 80 includes the shared bus interface circuitry 82, bus FIFO controller 84, DMA bus master controller, also DMA controller, or direct memory access unit 85, the configuration data transfer engine 86, management data transfer engine 88 (which both communicate to the management bus 78), and frame data transfer engine 90, which communicates to the frame bus 76.

Although not directly accessible by the host, the network controller also contains an embedded 32-bit RISC processor called the Communication Processor Core (CPC) 92. The CPC 92 handles such activities as gathering the per port statistics, DMA mode buffer management and data transfers, chip self-test and host/chip primitive command/response exchanges. The CPC 92 contains a CPU 94, ALU 96, timers 98, RAM 100, firmware ROM 102, and interrupt handlers 104.

Internal buses tie all of the controller's subsystems together to support management and frame data transfers in an efficient manner. Separate buses, as well as the management bus 78 and frame bus 76, are used for respective management data and frame data to increase parallelism and thereby increase performance.

Designed for store-and-forward or cut-through applications, the network controller 40 uses an on-chip DMA engine and an efficient buffer management algorithm to transfer frames between system memory and the eight on-chip 512 byte FIFOs 70,74 via the 32-bit data or frame bus 42. In this operation, the controller 40 negotiates to become a bus master, takes ownership of the system bus, and then directly moves frames and administration data between the chip and system memory 46.

Figure 3:
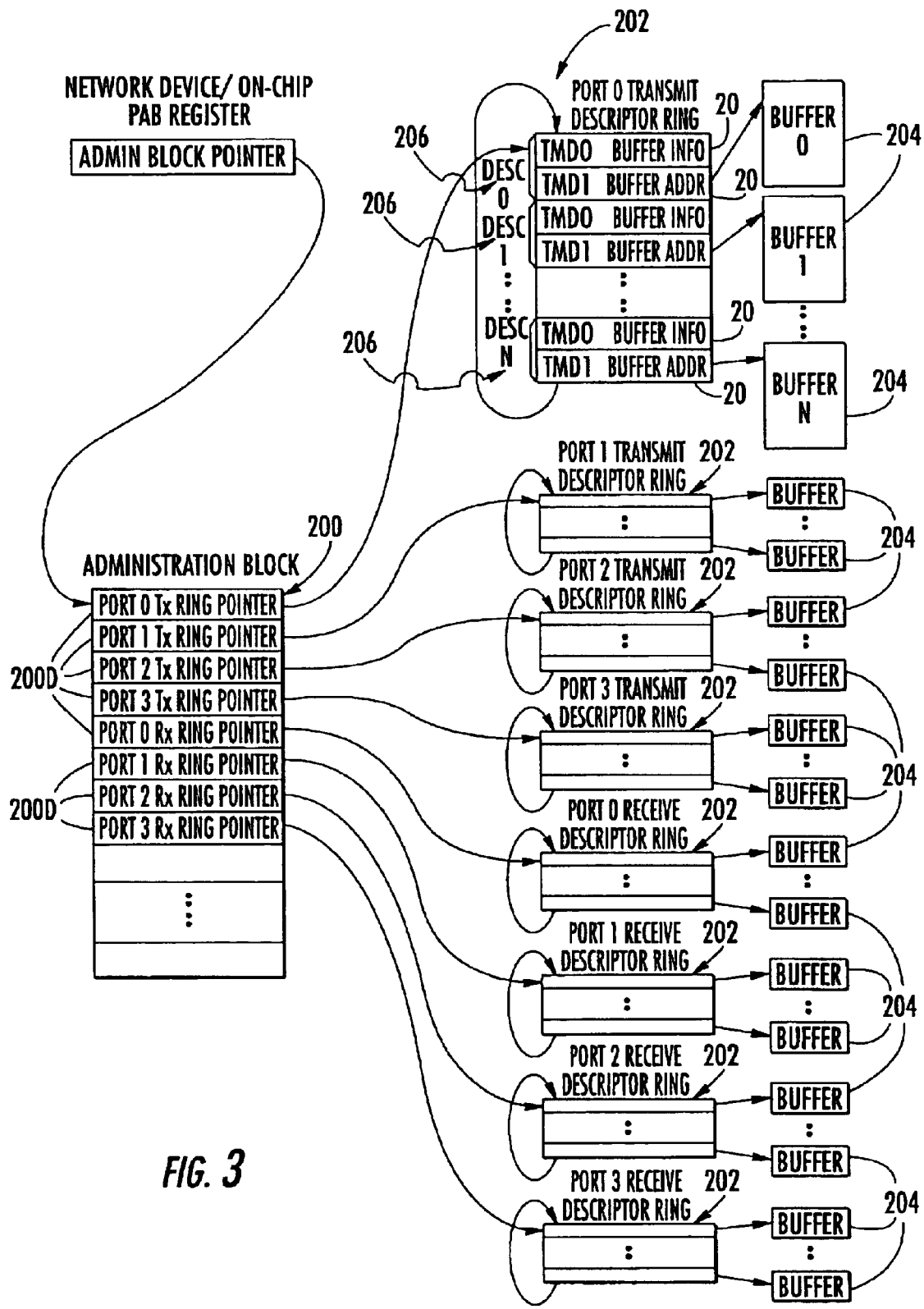
FIG. 3 is a high level block diagram of a buffer management and system memory used by an apparatus and network controller and showing the various descriptor rings.
Figure 4:
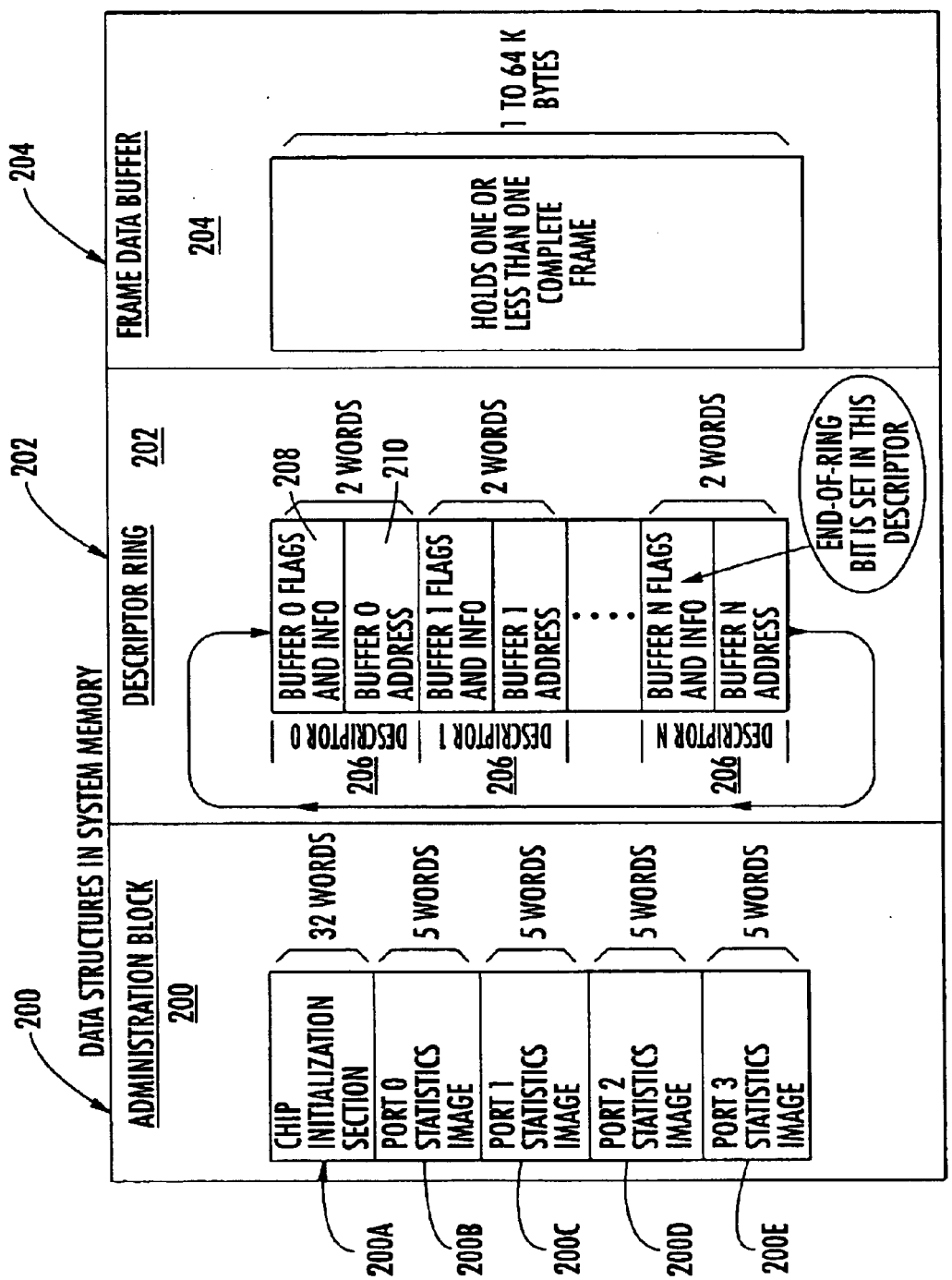
FIG. 4 is a high level block diagram of the data structure and system memory showing the administration block, descriptor rings, and frame data buffer.
Figure 5:
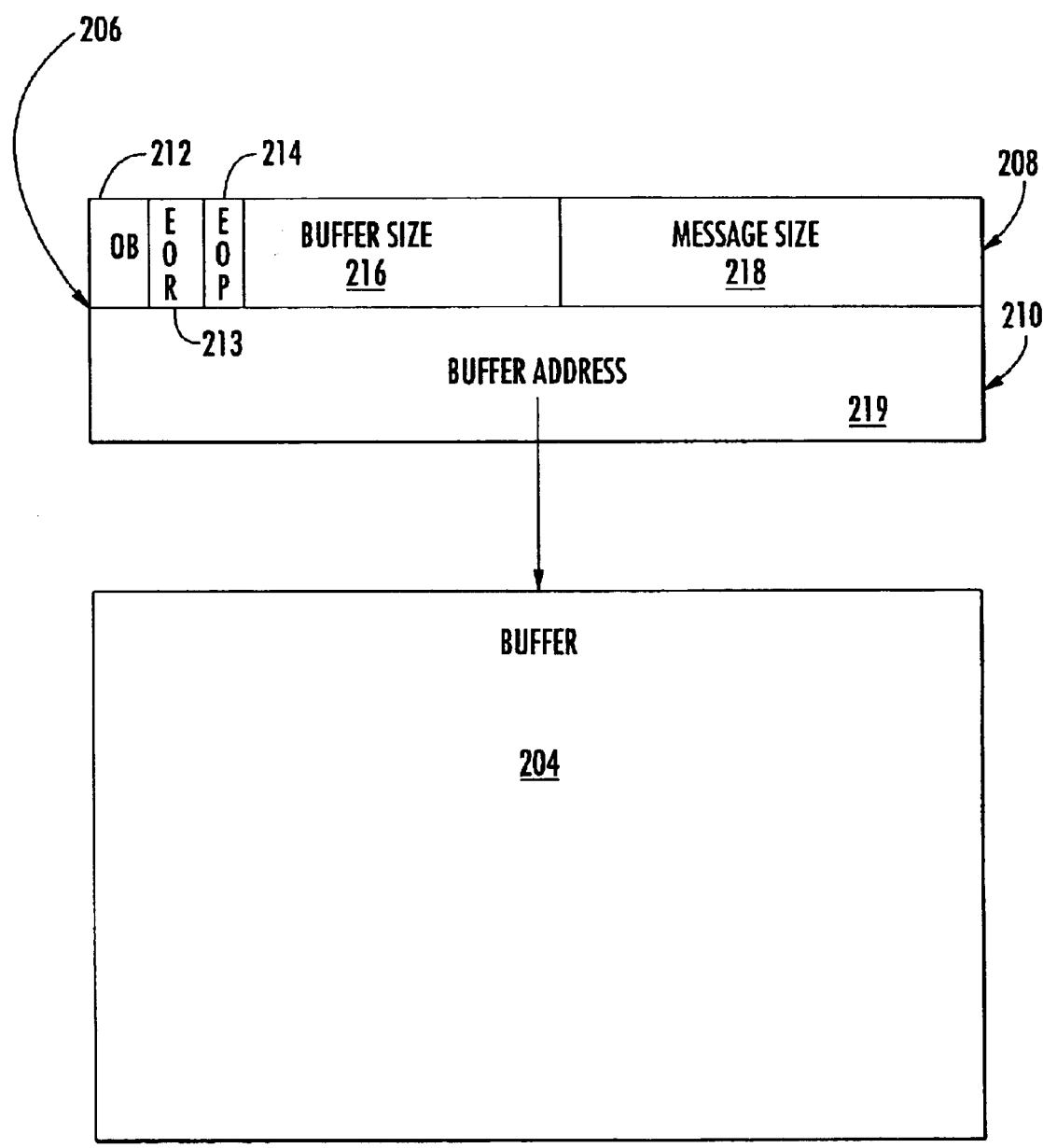
FIG. 5 is a high level block diagram of a descriptor and a buffer.
Figure 6:
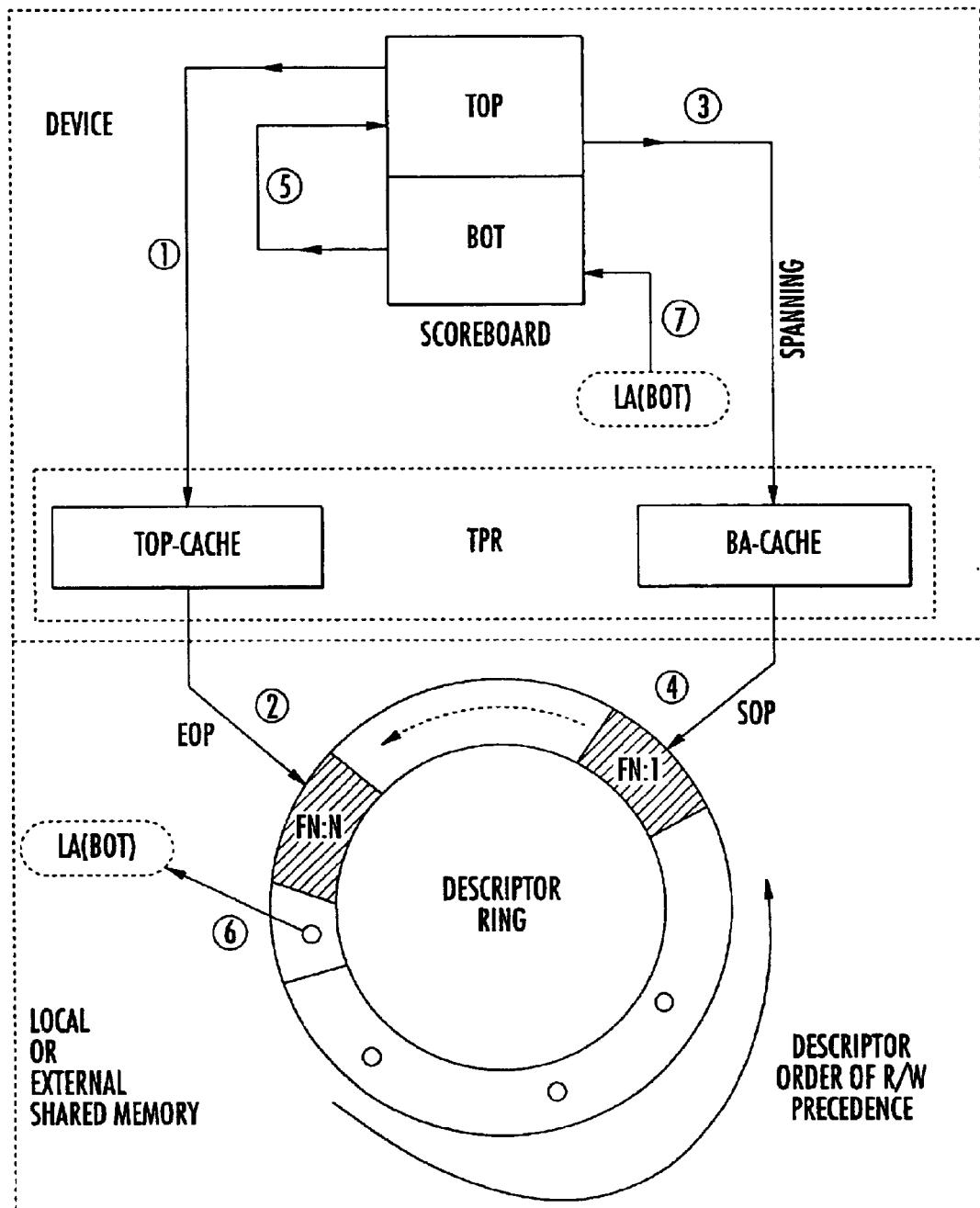
FIG. 6 is a high level block diagram of the fencepost descriptor caching mechanism of the present invention.
Figure 7:
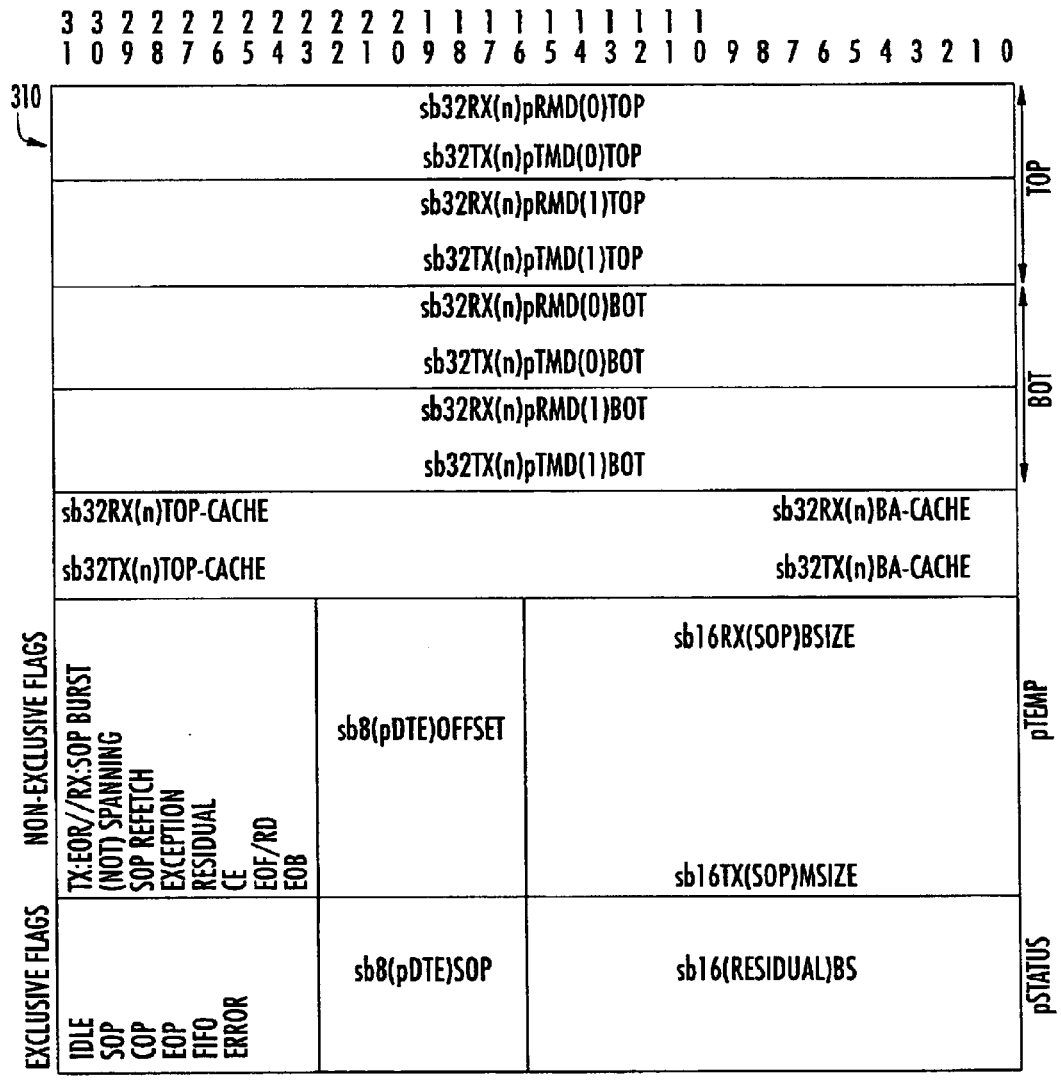
FIG. 7 is a high level block diagram of the TPR scoreboard.
Figure 8:
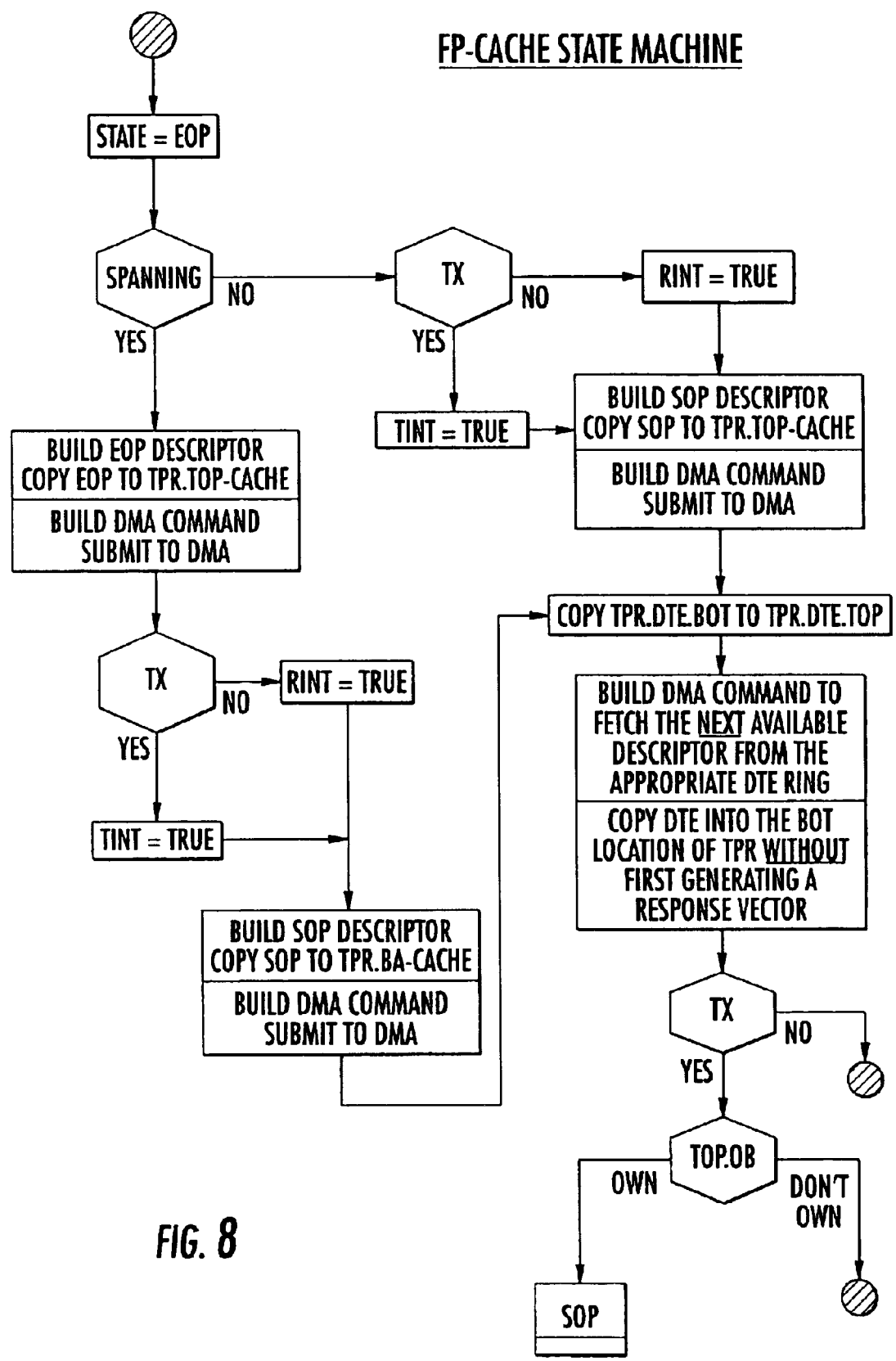
FIG. 8 is a flowchart illustrating the process of using the fencepost caching mechanism of the present invention.

A typical frame transmission takes place as follows. All frames are transmitted by the network controller 40 from transmit frame data buffer 204 assigned to entries in a transmit descriptor ring 202 (FIG. 3). When the system is ready for the network controller 40 to transmit a frame, it relinquishes ownership of the associated transmit descriptor (s) and then does one of two things: (1) waits for the controller's transmit poll timer to expire causing the chip to poll the Tx descriptor in search of a buffer it owns, or (2) is issued a Transmit Demand (TDMD) via the System Mode Register (SMR) by the host. In either case, the firmware instructs the DMA to begin fetching burst-size amounts of frame data from the buffer and placing it in the appropriate port's transmit FIFO. This will continue until the FIFO is filled above the programmed watermark or until the end of the frame is encountered.

Once enough words to satisfy the programmed transmit start point are in the transmit FIFO 70, the transmitter circuitry, which includes the transmit FIFO logic 66, and line transceiver 62, initiates the transmission. The transmitter circuitry performs a parallel to serial conversion sending a continuous serial data stream. Opening flag(s) are sent followed by the frame data and then the Cycle Redundancy Check (CRC) or Frame Check Sequence (FCS) for the frame. FCS calculation starts with the first octet of the frame. As the transmit FIFO 70 empties below a watermark setting, the transmitter circuitry issues a private interrupt to the on-chip firmware 102 requesting more data be copied from system memory.

A cycle of emptying (by transmitter unit) and filling (by DMA) continues until the end of frame (EOF) has been written into the FIFO. When the transmitter removes the last data of the frame from the transmit FIFO, it optionally appends the FCS it has calculated (FCS appending by controller can be controlled on a frame by frame basis). The transmitter closes the frame by sending a closing flag(s).

As noted before, each transmit channel and each receive channel within each port 50,52,54, and 56 use a dedicated descriptor ring 202. A descriptor ring 202 is a circular queue comprising of several two-word entries called "descriptors 206". Each descriptor 206 (DTE) describes one frame data buffer 204. The first word 208 of a descriptor 206 entry contains information about its frame data buffer 204 and the frame, or partial frame, that the frame data buffer contains. The second word 210 of a descriptor 206 is a system address, a pointer to the top of its associated frame data buffer. Descriptor rings 202 can range in size from 1 to 8K entries. The network controller 40 is given a pointer to the top of each ring in the administration block 200 at initialization. Descriptor entries 206 are always accessed sequentially starting at the top of the ring. The last descriptor in a descriptor ring 202 contains a flag marking the end of the ring. The controller returns or wraps to the first entry in the ring whenever it encounters an end-of-ring flag (EOR) 213.

An ownership bit (OB) 212 in the first word of each descriptor 206 indicates whether the host or controller owns the associated frame data buffer. Ownership follows a specific protocol that must be adhered to by the controller and the host. The rule is simple: once ownership of a descriptor 206 has been relinquished to the other part, no part of the descriptor or its associated buffer may be altered. The host gives the controller ownership of empty buffers for frame reception and full frame data buffers for frame transmission. Conversely, the network controller passes ownership back to the host for transmit buffers it has used and receives buffers it has filled.

For frame reception on any given port, the host 44 is required to provide the controller 40 with ownership of contiguous descriptors pointing to empty frame data buffers 204. After the very first words of the frame have been transferred to memory 46, a Frame Address Notification (FAN) interrupt is issued. Frame Address Notification interrupts are disclosed more throughly in co-pending application entitle "METHOD AND SYSTEM OF ROUTING NETWORK BASED DATA USING FRAME ADDRESS NOTIFICATION" filed Sep. 30, 1998, in the name of the same inventor as this application and assigned to the same assignee. The contents of the related application is hereby incorporated by reference. Once a frame is fully received by the controller, ownership of its constituent descriptors is then reassigned. The host is signaled regarding this event via an RINT interrupt. The host 44 is obligated to read a master interrupt register. (MIR) in order to surmise the specific port issuing the signal. Once this is accomplished, the frame may then be dispatched in some fashion and ownership of the relevant descriptors returned to the controller.

In typical operation, the host 44 "follows" the network controller 40 around the descriptor ring 202 leaving "empty" buffer descriptors 206 in its wake for the network controller 40 to use. If the network controller 40 gets too far ahead of the host 44, it can wrap around the descriptor ring 202 and encounter descriptors 206 it does not own. Incoming frames may be lost if this occurs. The host is informed of any receive FIFO 70 overflows via an Early Congestion Notification (ECN) interrupt. Early Congestion Notification (ECN) interrupts are disclosed more throughly in co-pending application entitled "METHOD AND APPARATUS FOR CONTROLLING NETWORK DATA CONGESTION" filed Sep. 30, 1998, in the name of the same inventor as this application and assigned to the same assignee. The contents of the related application is hereby incorporated by reference. The host may then react to alter its behavior in order to avoid additional lost frames.

For frame transmission on a given port, the network controller 40 "follows" the host 44 around a transmit descriptor ring 202 leaving used buffer descriptors in its wake for the host to reclaim. The host only gives the controller 40 ownership of descriptors 206 when it has one or more frames ready for transmission. Once a frame is fully transmitted by the controller, ownership of its constituent descriptors 206 is passed back to the host 44 for reuse. The host 44 is signaled regarding this event via a TINT interrupt.

For some applications, the host 44 may elect to use frame data buffers 206 which are smaller in size than the frames received or transmitted. A single frame spans multiple buffers. This allows frames to be dissected (scattered on reception) or assembled (gathered on transmission) by the network controller 40. Multiple data buffers can hold the constituent pieces of a frame by "chaining" the associated descriptors 206 together. By definition, chained descriptors are consecutive entries in a descriptor ring with the end-of-frame (EOF) flag 214 set in the terminating descriptor of the chain. In other words, the buffer of a descriptor entry, which is owned but whose end-of-frame flag is not set, is considered to be part of a frame, not an entire frame. Scatter/gather buffering benefits frames crossing multiple layers of communication protocol. Rather than laboriously copying large buffers from one service layer to the next, small pointers are passed instead. These pointers are ultimately converted into or generated from frame descriptors.

During reception of a large frame, the network controller 40 chains descriptors 206 together one by one as it completely fills each frame data buffer 204. When the end of frame is received and transferred to system memory, the end-of-frame (EOF) flag is set in the terminal descriptor of the chain.

During transmission, the network controller 40 is able to sequentially reconstruct a single frame from the contents of chained buffers. Transmission of the frame terminates when it encounters a buffer whose descriptor has set the end-of-frame bit.

The network controller 40 optimizes bus utilization whenever three or more frames data buffers are chained together by updating the first and last descriptor entries involved. When the network controller 40 is finished with the buffers involved in a chained frame, it first returns ownership of the last descriptor and then it returns ownership of the first descriptor. These are the "fence posts" of the frame. Fencepost buffering gets its name from the idea that rather than successively updating each spanned descriptor, only the terminal descriptors need to be altered. Thus at most one, in the case that a packet spans a single descriptor, or at most two descriptors ever need to be updated. The host 44 assumes ownership of all the intervening frame data buffers even though they remain marked as owned by the controller. Hence, whenever the host encounters a host owned descriptor (not marked by the end-of-frame flag), it should assume ownership of all successive descriptors up to and including the next host-owned descriptor (with the end-of-frame flag set).

The flags and fields of the first and last descriptor in a "fence-posted" chain are updated by the controller 40 to provide accurate information about a frame once it has been fully transmitted or received. The first word 208 of the descriptor also includes a buffer size 216 and message size 218. For receive frames, the message size 218 (MSIZE) field of the first descriptor in the chain is updated with the byte count of the entire frame, not simply the byte count of the associated frame data buffer (since this is equal to the buffer size). However, the message size field 218 of the terminal descriptor will contain only the actual number of bytes occupied by frame data in its associated buffer. This allows the host to easily locate the receive status word stored in the first complete word following the frame data in the buffer (note that the four bytes of the status word are not included in the count stored in the MSIZE fields).

Fenceposting may be utilized quite effectively in transmit windowing applications. In this scenario the host has designated a set of frames to be sent. After transmission, if a remote host fails to reply with an acknowledgment within some finite amount of time, the entire set or "window" maybe resent. Rather than update the descriptors of each and every frame sent, the device may delay until the entire set of frames has been successfully transmitted. At which point only the two terminal descriptors of the entire set need be updated.

Referring to FIGS. 6–11, a caching mechanism 300 may be used to support fencepost procedures in a receive or transmit mode. The caching mechanism 300 would permit descriptor transfer to and from memory in a reliable and efficient fashion. The caching mechanism 300 would further reduce complications arising from instrumenting a ring-buffer. The caching mechanism 300 would also help avoid resource race conditions between DMA and CPU, and reduce frame transfer latency.

The CPU has access to limited local RAM which it divides between storage for traffic statistics, descriptor ring operations, command and control functions, and various scratch calculations required to construct and maintain a steady stream of commands to the DMA. The CPU spends the majority of its time deciding which commands (FIGS. 12A–12B) must be built, building the commands and then relaying them to the DMA. Access to local RAM can be blocked and the CPU stalled if the CPU is waiting for the DMA to complete a R/W operation.

Figure 13:
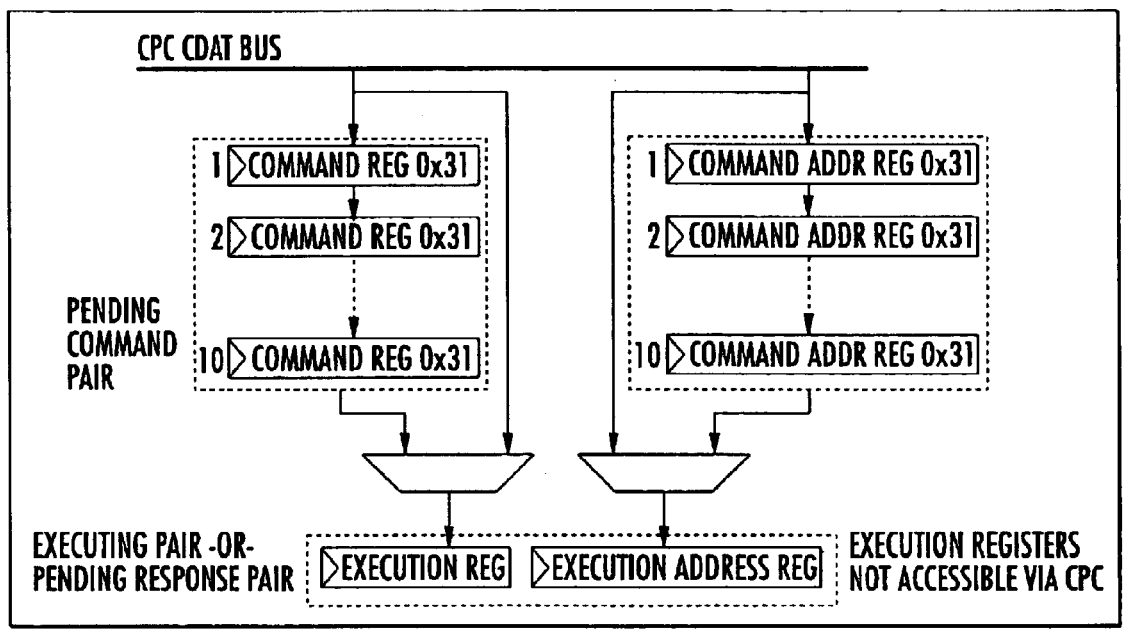
FIG. 13 is a high level block diagram of the DMA Command Queue.

The DMA in turn spends its time servicing the command stack, parsing the commands, arbitrating for the external system bus, and transferring data between external shared memory, the transmit and receive FIFO's, and local tri-port RAM. The DMA possesses a register stack (FIG. 13) which can hold up to a dozen commands. The depth of the stack was computed as a function of the maximum expected delay that four similar devices might experience from sharing a common bus. The stack frees the DMA to act in parallel with the CPU to a certain degree. It does however add an element of indeterminacy as the CPU generally can't be certain when any one particular command has been completed. Although the CPU is not required to poll or wait for the DMA to complete an operation, the DMA is obligated to stall the CPU whenever it accesses the local RAM.

A fencepost descriptor caching mechanism 300 was developed to support fence-posting operation. This is a non-blocking operation designed to avoid any resource constraints. The caching mechanism 300 has a two section cache 310: a top cache 312 and a bottom cache 314. The top cache 312 is used to store the End of Frame descriptor prior to a memory write back. The bottom cache 314 is similarly used to temporarily store the Start of Packet (SOP) descriptor.

The caching mechanism 300 requires every active channel to support a minimum of two, contiguous, resident, on-chip descriptors. Both descriptors are fetched from external memory at initialization time. Subsequent activation of the channel "consumes" the descriptors as their associated buffers are either filled or emptied.

The two descriptor locations are discriminated from one another via "TOP" 316 and "BOT" 318 address designations. The TOP 316 address is always the active or current descriptor in use. The BOT 318 descriptor is a descriptor which is held in reserve. When the TOP 316 descriptor is consumed, the BOT 318 descriptor is copied into the TOP 316 location and the DMA is instructed to fetch the next descriptor in the external ring. The DMA accomplishes this in a non-blocking fashion and the device is not stalled pending completion of this operation. Once the next descriptor is fetched, it is immediately written into the BOT 318 location. This procedure continues until one of two events occur: either an End of Frame (EOF) will be detected, or less probable, but still possible, a network or host interface error will occur.

Ring protocol requires that before ownership of a frame can be reassigned, the terminal descriptors must flip their ownership flags (OB). For this reason, the EOF descriptor is written back to external memory before the starting (SOP) descriptor. At EOF, the TOP 316 descriptor is edited to reflect the contents of the buffer and the OB is flipped. The descriptor is then copied to a predefined location in local memory (i.e., TOP-CACHE 312) while a two word command is issued to the DMA requesting transfer of the descriptor to the external ring. The DMA decodes the command and performs the transfer in parallel with the CPU.

Frame descriptors have been purposefully compressed to fit into two words in order to minimize the enormous overhead of bus traffic associated with data-structures. Use of the cache allows two descriptors per channel to be managed in local RAM. While one descriptor is active the other serves in a look-ahead or reserve role. Only the first word of each 2-word descriptor is actually stored in the cache and returned to the external ring. The first word contains the flipped ownership bit, relevant error flags, and byte count of the buffer. There is no need to store the second word, the buffer pointer, as it is never actually altered from the original image in the ring. The stall time for the CPU and the load on the system bus are both effectively reduced through these measures. The CPU avoids contention for local memory with the DMA by moving pending descriptor transfer to the cache. The DMA in turn minimizes both CPU stalls and bus overhead by a reduction of descriptor R/W cycles.

All receive and transmit frame activity has been split into three "event" horizons referred to as "SOP", "COP", and "EOP". The Start of Packet (SOP) event functions as a transition phase providing necessary state setup and performing various housekeeping chores. Data transfers are handled exclusively within the Continuation of Packet (COP) phase. There is considerable descriptor activity during this phase: descriptors (DTE) are consumed as their associated buffers fill up; and DTE's are fetched as needed whenever additional external memory buffers are required. The final transition is accomplished with the End-of-Packet (EOP) phase. Ownership of the frame is effectively transferred to the host entity while various data structures are updated locally in tri-port RAM (TPR) and in external shared memory.

Figure 9:
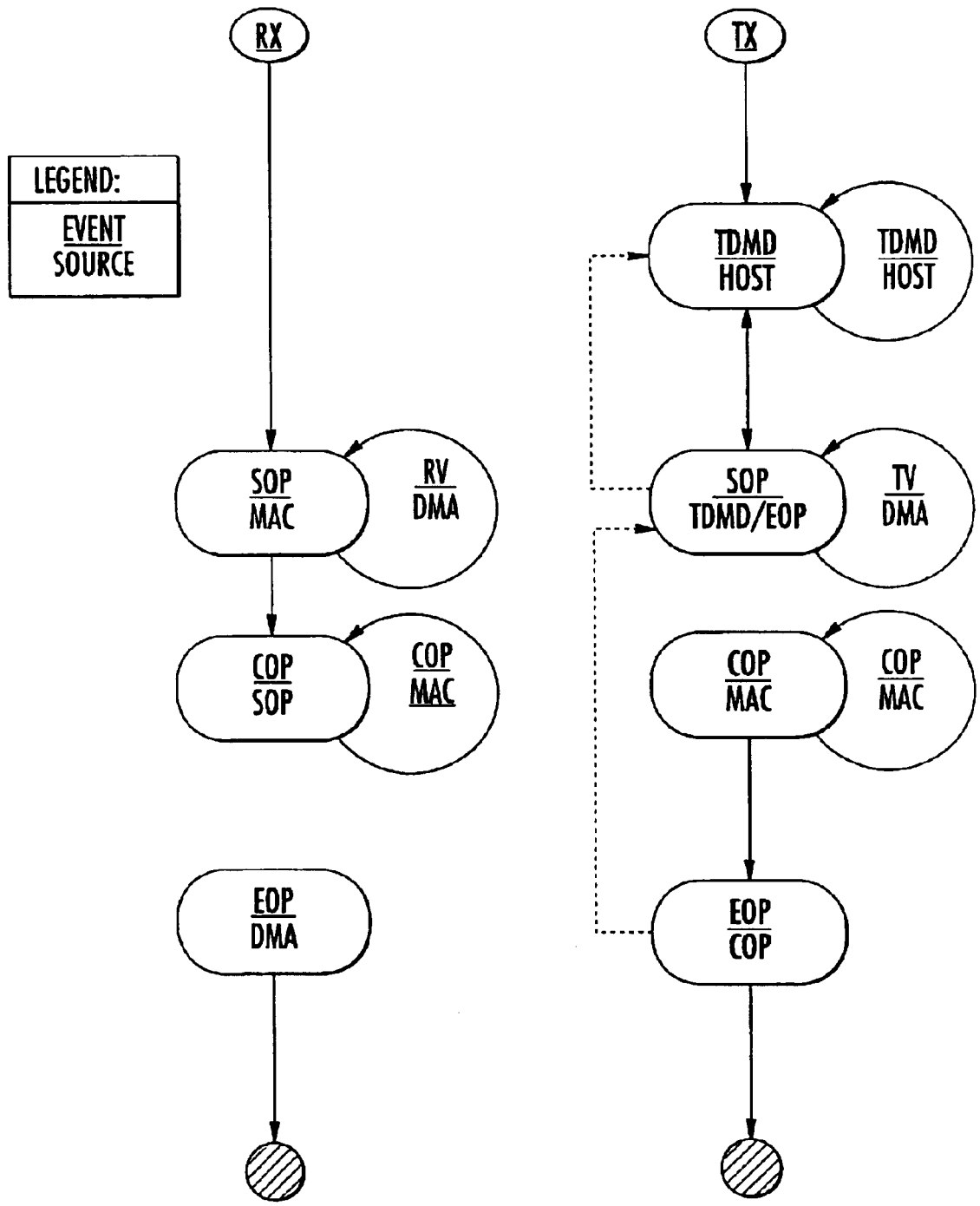
FIG. 9 is a flowchart illustrating the receive versus transmit interrupt state machines.

All of the frame handling events are interrupt-mediated (FIG. 9). The receipt of a frame on any channel triggers a succession of interrupts beginning with a channel-specific SOP followed by one or more response vectors (RV) from the DMA as needed. A SOP generates an RV when it discovers that it does not own the current DTE image. As data accumulates in the RX FIFO, one or more COP's are generally issued until the DMA-has successfully transferred the entire frame. The DMA identifies the end of the frame by triggering an EOP interrupt.

Several important differences exist between RX and TX operations beyond the obvious direction in data transfer. In contrast to frame reception, where the channel is responsible for initiating the sequence of events, transmission is initiated solely by the host via a Transmit Demand (TDMD) interrupt.

The initial DMA data burst for RX is initiated from a SOP that transitioned to COP without an intervening interrupt source. All TX COP phases are entered via interrupts. In addition, during transmission, the DMA is not required to detect the terminal byte of a frame since the length of the frame is already known from the descriptor table entry (DTE) image. Control transitions to the EOP phase once the transmit COP phase issues a command to the DMA instructing it to transfer the terminating data-burst. There is no intervening EOP interrupt.

Figure 10:
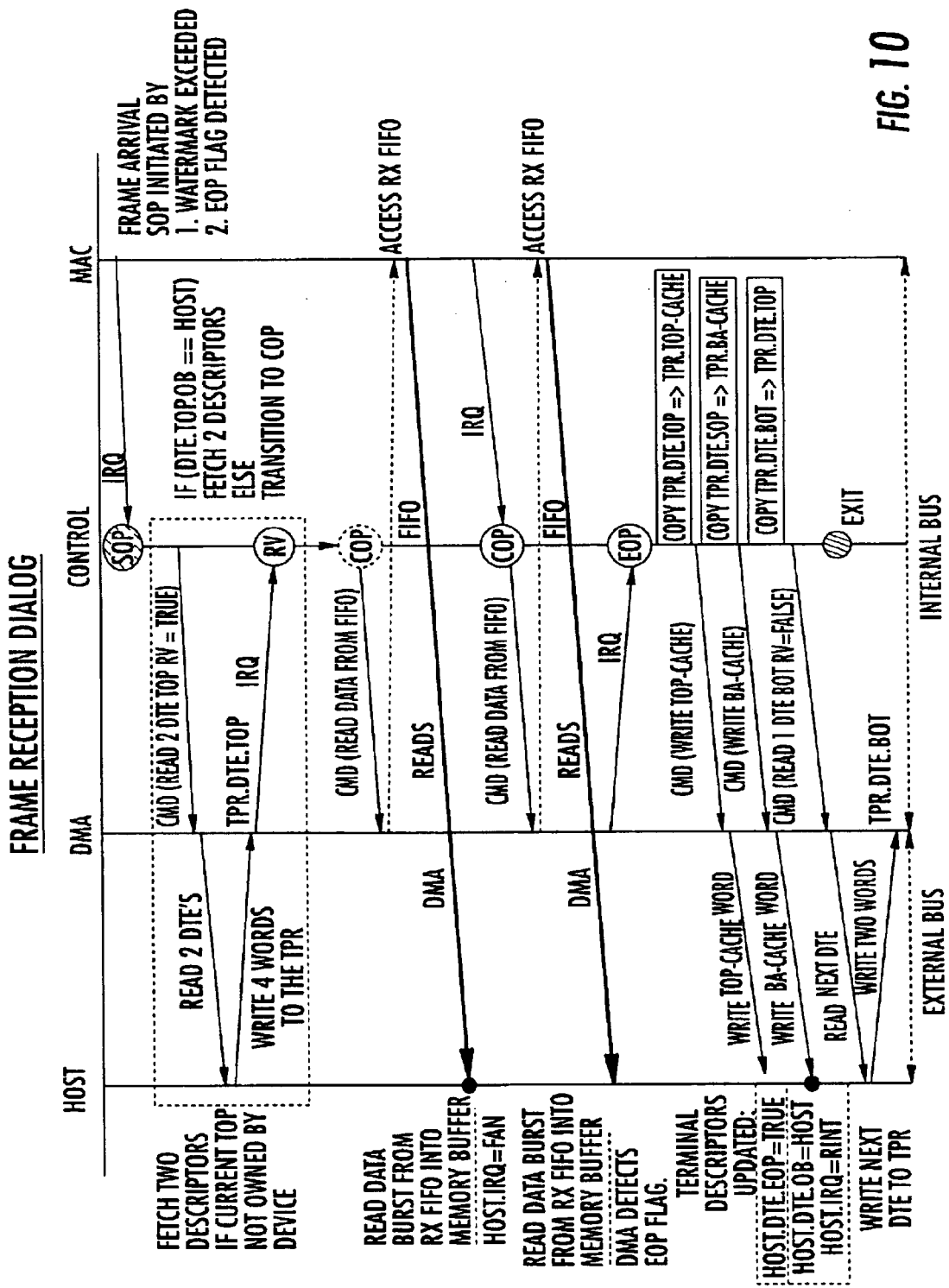
FIG. 10 shows the frame reception dialog.

A more detailed description of the frame reception process can be followed from FIG. 10. The arrival of a frame on any receive channel generates an SOP interrupt which is then enqueued on one of three priority queues. Once all intervening interrupts have been serviced, the CPU will then relinquish control to this SOP, which will then proceed to check an on-board (TPR) channel-specific descriptor for ownership. If the device owns the descriptor (TOP) control will then transition to the COP phase. Otherwise, a command is built and issued to the DMA requesting that both descriptors (TOP and BOT) be refreshed from external memory. The SOP interrupt then immediately exits. The DMA wakes the SOP thread via a Response Vector (RV) interrupt-when the descriptor R/W operation has completed. Although the SOP transitions into the initial COP phase, all subsequent COP interrupts are generated by the channel. The COP process consists of building and issuing commands to the DMA instructing it to either transfer a predefined data "burst" from the RX FIFO or, if the current buffer has been filled, to fetch the next DTE from the descriptor ring in external memory. Once the DMA detects it has transferred the terminal byte of the frame it proceeds to enqueue an EOP interrupt for the appropriate channel.

The EOP interrupt is the last phase in the transfer of a frame involving the device. The fencepost caching mechanism has been implemented primarily as a component of the EOP phase. The fields of the current or "TOP" descriptor are updated with the length of the frame and relevant error information while the ownership flag is flipped to "HOST". The frame is then evaluated whether it spans more than one descriptor. If not, then only the updated word of this DTE is copied to the TOP-CACHE address and the DMA is issued a command to return the word to its ring location in external memory. The 2-word descriptor in the BOT location (channel-specific) of the TPR is then copied directly into TOP in preparation for the next frame. The final EOP command to the DMA fetches the next available descriptor from the DTE ring and writes it into BOT.

A frame is said to "SPAN" descriptors if it requires multiple descriptors and their associated buffers for storage. In order to "hand-off" the spanning frame to the host entity, two descriptors must be returned to the ring: 1. the SOP DTE, or starting descriptor; and 2. the EOP DTE, or terminating descriptor. Ownership of both DTE's must be reassigned via setting the "OB" field in the first word of the descriptor. Any intervening descriptors are ignored and their ownership fields remain assigned to "DEVICE". Once the EOP DTE descriptor word is built and copied to TOP-CACHE a DMA transfer command will be issued. The first word of the SOP DTE descriptor is then reconstructed, and copied to BA-CACHE. A DMA transfer command is then issued with the additional request for a RINT interrupt to be signaled to the host entity once the transfer operation has completed. By delaying the RINT until the SOP DTE has been written back to the ring we effectively block the host from acquiring the frame too early. Non-spanning frames employ their single descriptor-transfer command to signal RINT. The RINT informs the host that a frame has been successfully received and that it may now proceed along the ring and retrieve the frame. The RINT is not channel-specific however and the host is obligated to read the Master Interrupt Register (MIR) in order to discern the responsible channel.

The device is no longer involved with the frame beyond this point. The host, however, must decide what to do with the frame now that it has control (forward it or delete it). Ultimately the host must release the descriptors and buffers back to the device pool. It runs the risk of dropping frames if it stalls or delays beyond a reasonable, calculable, interval. The rate of DTE consumption may be estimated by averaging frame size over some finite arrival interval for the effective arrival rate and dividing this into the product of the number of used descriptors and their respective buffer sizes. Studies of the Internet have demonstrated that arrival rates and frame sizes exhibit fractal behavior so reliance on these estimates may be unreliable.

Figure 11:
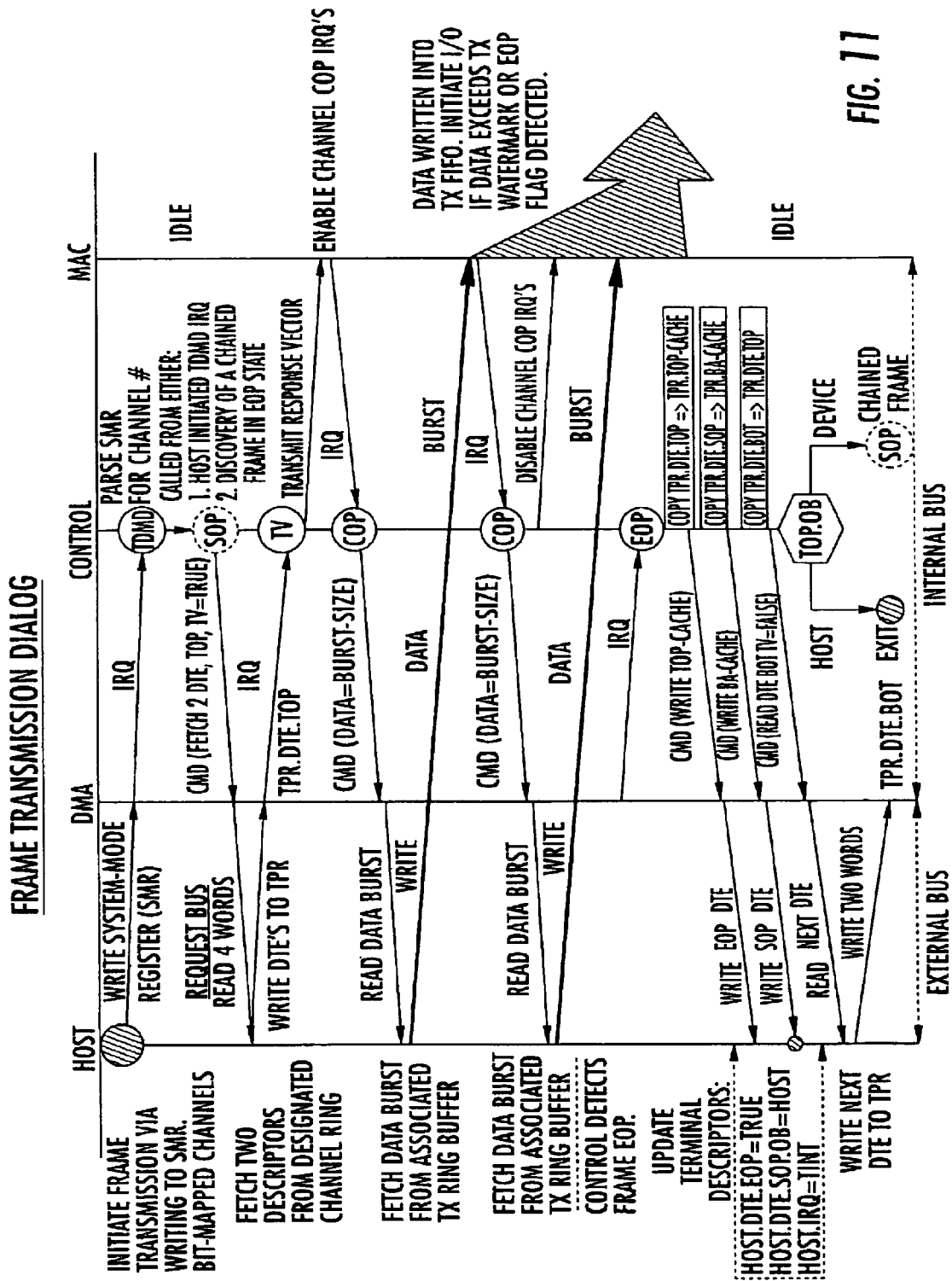
FIG. 11 shows the frame transmission dialog.

Frame transmission is initiated by the host entity (FIG. 11). This is accomplished by a write to the System Mode Register (SMR). The four transmit channels are bit-mapped to the lowest nibble. A write will cause the DMA to generate a Transmit Demand interrupt (TDMD). If all previous transmit demand operations have either completed or been initiated, a copy of the SMR is then made for future reference while the SMR transmit control nibble is read-cleared. The four channels are serviced in a round-robin fashion and the SOP phase is entered for the first appropriate channel. Back-to-back TDMD's may be initiated by the host without any destructive, or for that matter useful, effects. Optimal transmit control requires the host to track channel-specific activity based on TINT acknowledgments.

The transmit SOP phase immediately commands the DMA to fetch two descriptors from the external shared memory rings and execution exits. The SOP thread is subsequently reentered via a Transmit Vector (TV) signal from the DMA after it has completed the transfer. The FIFO control logic is then enabled to generate COP interrupts via the Port Control Register (PCR) and the SOP phase terminates. The data and descriptor transfer operations of the transmit COP phase are effectively similar to the receive COP phase except that there is no interrupt transition to the EOP phase. After the last data transfer, the PCR register is cleared in order to disable further COP interrupts. The transition to EOP is then made. There is no necessity for an explicit transmit EOP interrupt since the end-of-packet field of the TOP descriptor image (previously set by the host) is readable during COP.

The transmit descriptor ring is updated in the same manner as the receive ring. For frames spanning multiple DTE's, the terminal or EOP DTE is written back first while the SOP DTE is written second. The BOT DTE is copied into the TOP address location and a look-ahead read is issued to the DMA for the next DTE in the ring. After the DMA completes the SOP DTE write to external memory it issues a TINT interrupt to the host. The host may then read the MIR to learn which channel was responsible for the signal. In the event the new TOP DTE is owned by the device a direct transition back to SOP can be made, albeit with a different entry point. Multiple or "chained" frames may be transmitted in this way without the necessity or incurring the overhead costs for individual TDMD's by the host.

The host should observe that the ownership of spanned descriptors will remain flagged as "DEVICE" owned. The descriptors may be reused for transmit but the ownership fields of the intervening DTE's must be reset otherwise the host runs the risk of issuing an additional or "babbling" frame. Alternatively, the "empty" descriptors may be added to the RX device pool after ownership of the terminal descriptors has been reassigned. In order to avoid descriptor ring collisions, reassignment of DTE ownership by the host should be done in the same reverse order as the device.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for reducing transfer latencies in fencepost buffering associated with a network controller and a host entity with shared memory, the method comprising the steps of:
    providing a cache between the network controller and the host entity;
    fetching a first and second descriptor address location from the shared memory wherein the first descriptor address location is a location of an active descriptor and the second descriptor address location is a location of a reserve descriptor;
    copying the active descriptor to the cache; and
    issuing a command to a direct memory access unit (DMA) of the network controller for transfer of the active descriptor back to the shared memory.

2. The method according to claim 1, and further comprising the step of holding the active descriptor as a current descriptor within a top cache.

3. The method according to claim 2, and further comprising the step of copying a reserve descriptor from a bottom cache into the top cache when the current descriptor in the top cache is consumed.

4. The method according to claim 3, and further comprising the step of fetching the next descriptor in an external ring of descriptors when the reserve descriptor is copied into the top cache.

5. The method of claim 3, and further comprising the step of copying the second descriptor address location into the first descriptor address location after the active descriptor, is copied to the top cache.

6. The method of claim 1, further comprising the steps of:
    fetching a next descriptor address location from the shared memory; and
    placing the next descriptor address location in the second descriptor address location.

7. The method of claim 1, further comprising the step of updating the ownership of terminal descriptors associated with a frame, the terminal descriptors comprising an End of Frame (EOF) descriptor and a Start of Packet (SOP) descriptor.

8. The method of claim 7, wherein the step of updating the ownership of the terminal descriptors further comprises the step of writing the EOF descriptor to the shared memory before writing the SOP descriptor to the shared memory.

9. The method of claim 8, further comprising the step of setting an ownership bit in the EOF descriptor when the EOF descriptor is the active descriptor.

10. The method of claim 9, further comprising the step of:
    re-editing the active descriptor to build an image of the SOP descriptor;
    copying the SOP descriptor to the cache; and
    issuing a command to the DMA requesting transfer of the SOP descriptor to shared memory.

11. A method for reducing transfer latencies in fencepost buffering having chained descriptors including an End of Frame (EOF) descriptor and a Start of Packet (SOP) descriptor, defining terminal descriptors, associated with a frame, the method comprising the steps of:
    providing a cache between a host and a network controller having shared memory;
    fetching a first and second descriptor address location from shared memory wherein the first descriptor address location is a location of an active descriptor and the second descriptor address location is a location of a reserve descriptor; and
    updating ownership of terminal descriptors by writing the EOF descriptor of the frame to the shared memory before writing the SOP descriptor of the frame to the shared memory; and
    issuing a command to a direct memory access unit (DMA) for transfer of the active descriptor back to the shared memory.

12. The method according to claim 11, and further comprising the step of holding the active descriptor as a current descriptor within a top cache.

13. The method according to claim 12, and further comprising the step of copying a reserve descriptor from a bottom cacheinto the top cache when the current descriptor, in the top cache is consumed.

14. The method according to claim 13, and further comprising the step of fetching the next descriptor in external ring of descriptors when the reserve descriptor is copied into the top cache.

15. The method of claim 13, wherein the step of updating the terminal descriptors further comprises the steps of:
    re-editing the active descriptor to build an image of the SOP descriptor; and
    copying the SOP descriptor to the bottom cache.

16. The method of claim 11, further comprising the step of copying the second descriptor address location into the first descriptor address location after the active descriptor is copied to the cache.

17. The method of claim 16, further comprising the steps of:
    fetching a next descriptor address location from the shared memory; and
    placing the next descriptor address location in the second descriptor address location.

18. A system for reducing transfer latencies in fencepost buffering having chained descriptors including an End of Frame (EOF) descriptor and a Start of Packet (SOP) descriptor, defining terminal descriptors, associated with a frame, the system comprising:
    a network controller including a direct memory access unit (DMA);
    a host entity with shared memory;
    a cache between said network controller and said host entity;
    means for fetching a first and second descriptor address location from shared memory wherein the first descriptor address location is a location of an active descriptor and the second descriptor address location is a location of a reserve descriptor;
    means for updating the ownership of terminal descriptors by writing the EOF descriptor of the frame to shared memory before writing the SOP descriptor of the frame to shared memory; and means for issuing a command to DMA for transfer of the active descriptor back to the shared memory.

19. The system according to claim 18, wherein said cache comprises a top cache the holds the active descriptor as a current descriptor.

20. The system according to claim 19, wherein said cache comprises a bottom cache for holding a reserve descriptor that is copied into the top cache when the current descriptor in the top cache is consumed.

21. The system according to claim 20, and further comprising an external ring of descriptors from which a descriptor is fetched when the reserve descriptor in the bottom cache is copied into the top cache.

22. The system of claim 20, wherein the means for updating the terminal descriptors further comprises:

means for reediting the active descriptor to build an image of the SOP descriptor; and means for copying the SOP descriptor to the bottom cache.

23. The system of claim 18, further comprising means for copying the second descriptor address location into the first descriptor address location after the active descriptor is copied to the top cache.

24. The system of claim 23, further comprising:

means for fetching a next descriptor address location from the shared memory; and means for placing the next descriptor address location in the second address location.

25. A system for reducing transfer latencies in fencepost buffering, associated with a network controller and a host entity with shared memory, and having chained descriptors including an End of Frame (EOF) descriptor and a Start of Packet (SOP) descriptor, defining terminal descriptors, associated with a frame, the system comprising:

a cache between the network controller and the host entity; and a cache controller to fetch a first and second descriptor address location from shared memory, the first descriptor address location being a location of an active descriptor and the second descriptor address location being a location of a reserve descriptor, to update the ownership of terminal descriptors by writing the EOF descriptor of the frame to shared memory before writing the SOP descriptor of the frame to shared memory, and to issue a command to a direct memory access unit (DMA) of the network controller for transfer of the active descriptor back to the shared memory.

26. The system according to claim 25, wherein said cache comprises a top cache the holds the active descriptor as a current descriptor.

27. The system according to claim 26, wherein said cache comprises a bottom cache for holding a reserve descriptor that is copied into the top cache when the current descriptor in the top cache is consumed.

28. The system according to claim 27, and further comprising an external ring of descriptors from which a descriptor is fetched when the reserve descriptor in the bottom cache is copied into the top cache.

29. The system of claim 27, wherein the cache controller re-edits the active descriptor to build an image of the SOP descriptor, and copies the SOP descriptor to the bottom cache.

30. The system of claim 27, wherein the cache controller copies the second descriptor address location into the first descriptor address location after the active descriptor is copied to the top cache.

* * * * *

UNITED STATES PATENT AND TRADEMARK OFFICE
CERTIFICATE OF CORRECTION

PATENT NO. : 6,941,391 B2  Page 1 of 1
APPLICATION NO. : 10/758379
DATED : September 6, 2005
INVENTOR(S) : Christian D. Kasper It is certified that error appears in the above-identified patent and that said Letters Patent is hereby corrected as shown below:

| | |
|---|---|
| Column 7, Line 29 | Delete: "entitle"<br>Insert: -- entitled -- |
| Column 7, Line 38 | Delete: "register. (MIR)"<br>Insert: -- register (MIR) -- |
| Column 10, Line 60 | Delete: "DMA-has"<br>Insert: -- DMA has -- |
| Column 11, Line 24 | Delete: "interrupt-when"<br>Insert: -- interrupt when -- |
| Column 14, Line 27 | Delete: "cacheinto"<br>Insert: -- cache into -- |
| Column 15, Line 4 | Delete: "the holds"<br>Insert: -- that holds -- |
| Column 15, Line 4 | Delete: "reediting"<br>Insert: -- re-editing -- |
| Column 16, Line 16 | Delete: "the holds"<br>Insert: -- that holds -- |

Signed and Sealed this

Thirtieth Day of January, 2007

JON W. DUDAS
*Director of the United States Patent and Trademark Office*